United States Patent Office 3,329,688
Patented July 4, 1967

3,329,688
LACTONIZATION PROCESS
Ben E. Edwards and Narasimha Rao Pemmaraju, San Antonio, Tex., assignors to Southwest Foundation for Research and Education, San Antonio, Tex., a corporation of Texas
No Drawing. Filed Apr. 15, 1964, Ser. No. 360,059
14 Claims. (Cl. 260—343.2)

This invention relates to methods for the conversion of delta-keto acids to enol-lactones and is particularly concerned with providing a unique and remarkably rapid and efficient method for carrying out such conversion at room temperature and under atmospheric conditions.

Prior to the instant invention, conversion of such keto-acids to enol-lactones typically required extended refluxing operations, i.e., 4 to 48 hours. Obviously, the economics of these time requirements is most undesirable, particularly in commercial processes. Since such processes depend upon sustained elevated temperatures, it is difficult to control side reactions and percentage yield of reaction product.

The present invention provides a method for converting delta-keto-acids to enol-lactones in several minutes' time, at room temperature, under atmospheric conditions and without side reactions.

In accordance with this invention, a keto-acid, such as those steroidal keto-acids, typically prepared by ozonolysis of a steroid containing a conjugated carbonyl group, i.e.,

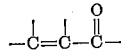

in the steroid nucleus, is lactonized by admixing it with a reagent composition comprising a non-hydroxylic, non-etherated organic liquid containing a dehydrating agent and a small amount of perchloric acid and permitting it to react at room temperature and atmospheric conditions for several minutes. The reaction product, i.e., the corresponding enol-lactone is then isolated by conventional methods.

Conversion at either the A or B ring may be carried out with this process. Thus, the reaction may be generally represented as follows:

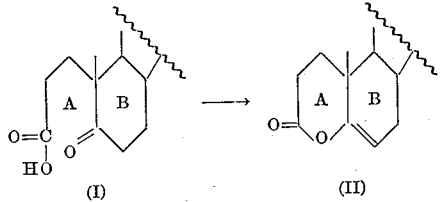

In this typical reaction the keto-acid (I), typified by steroidal 4-nor-3,5-seco-5-oxo-3-oic acids, is treated with an ethyl acetate-acetic anhydride perchloric acid reagent for about five minutes at room temperature and atmospheric conditions. At the end of five minutes, the reaction will typically give a crude product in excess of 90% yield of the A ring enol-lactone (II).

And,

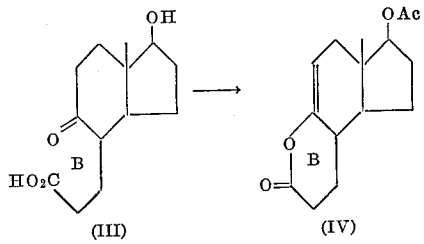

In this representative reaction the keto-acid typified by delta-keto acid (III) is treated with an ethyl acetate-acetic-anhydride-perchloric acid reagent for about five minutes at room temperature and atmospheric conditions. Again, at the end of five minutes, the reaction will typically give a crude yield in excess of 90% of the B ring enol-lactone (IV).

More particular illustration of the invention may be had by reference to the following specific examples.

Example I

A quantity of reagent comprising ethyl acetate, acetic anhydride and perchloric acid was prepared by admixing 50 ml. of absolute ethyl acetate and 0.05 ml. of 72% perchloric acid (0.575 mmole). Ten ml. of this solution was then added to 30 ml. of absolute ethyl acetate and 4.8 ml. (51 mmole) of acetic anhydride. The total solution was then made up to 50 ml. with ethyl acetate to give a 1 mole acetic anhydride concentration and a $10^{-3}$ mole perchloric acid concentration in ethyl acetate.

Using this reagent, 5,20-dioxo-3,5-seco-4-norpregnan-3-oic acid was treated as follows:

51.3 mg. of the keto-acid was dissolved in 5 ml. of reagent and let stand at room temperature and atmospheric pressure for 5 minutes. At the end of 5 minutes the reaction was quenched by the addition of 1 ml. of saturated aqueous sodium bicarbonate and the two phase system was thoroughly mixed. The upper (ethyl acetate) layer was transferred by pipette and percolated through a small (10 mm.) tube, plugged at one end with cotton and packed with about 1 inch of anhydrous sodium sulfate mixed with a small amount of anhydrous potassium carbonate. The aqueous layer was washed with 2× 5 ml. portions of ethyl acetate, and the washings were passed through the tube and combined with the first ethyl acetate solution. A 10 ml. portion of absolute methanol containing a trace of pyridine was added to destroy any excess acetic anhydride and the solution was evaporated to dryness under vacuum in a nitrogen atmosphere on a water bath at 70° to give 47.2 mg. (98%) of crude lactone, M.P. 136–149°. Thin layer chromatography of a sample of the crude product on silica gel microplates in the system benzene–20% ethyl acetate indicated that the product was a single compound. Recrystallization from methanol containing a trace of pyridine gave the analytical sample, M.P. 153–155°. [Lit M.P. 157°, M. Gut. Helv. Chim. Acta, 36, 906 (1953).]

Analysis.—Calc'd. for $C_{20}H_{28}O_3$: C, 75.92; H, 8.91. Found: C, 76.27; H, 8.81.

Example II

Using the reagent of Example I, 48.6 mg. of 5-oxo-3,5-seco-4-norcholestan-3-oic acid was treated by the procedure outlined in Example I to give 45.6 mg. (97%) of crude lactone, M.P. 84–88°. Recrystallization from dilute acetone gave the analytical sample, M.P. 91–92°. [Lit. M.P. 94°, R. B. Turner, J. Am. Chem. Soc., 72, 579 (1950).]

Analysis.—Calc'd. for $C_{26}H_{42}O_2$: C, 80.77; H, 10.95. Found: C, 80.67; H, 11.43.

Example III

Using the reagent of Example I, 59.2 mg. of 17α-acetoxy - 5,20 - dioxo - 3,5-seco-4-norpregnan-3-oic acid was treated by the procedure outlined in Example I to give 56.0 mg. (99%) of crude lactone, M.P. 287–290° (dec.). Recrystallization from methylene chloridemethanol gave the analytical sample, M.P. 288–290° (dec.).

Analysis.—Calc'd. for: $C_{22}H_{30}O_5$: C, 70.56; H, 8.08. Found: C, 69.84; H, 8.03.

Example IV

Using the reagent of Example I, 50.0 mg. of 5,17-dioxo-3,5-seco-4-norandrostan-3-oic acid was treated by the procedure outlined in Example I to give 43.6 mg. (93%) of crude lactone, M.P. 138–143°. Recrystallization from dilute acetone gave the analytical sample, M.P. 143.5–144.5°.

Analysis.—Calc'd. for $C_{28}H_{24}O_3$: C, 74.97; H, 8.39. Found: C, 75.26, H, 8.45.

Example V

A reagent containing 2 moles/l. of $Ac_2O$ and 0.15 mole/l. of $HClO_4$ was prepared as in Example I. A sample of 100 mg. of 17β-hydroxy-5-oxo-3,5-seco-4-norandrostan-3-oic acid was dissolved in 2 ml. of this reagent at 5° C. and mixed well for 2.5 minutes. The reaction was quenched by addition of $H_2O$ and the product was extracted with ethyl acetate. The ethyl acetate extract was washed with saturated aqueous sodium bicarbonate solution and brine, dried over anhydrous sodium sulfate, and the solvent evaporated. Chromatography of the residue in 10 g. of silica gel gave the enol-lactone in 95% yield. The analytical sample, recrystallized from acetone-hexane, melted at 129–130.5°. [Lit. P. Narasimha Rao and L. R. Axelrod Chem. and Ind., 1838 (1963).]

Analysis.—Calc'd. for $C_{20}H_{28}O_4$: C, 72.26; H, 8.49. Found: C, 72.51; H, 8.44.

Example VI

Using 5 ml. of the reagent of Example I, 66 mg. of 17β-hydroxy - 5 - oxo-3,5-seco-4-norestran-3-oic acid was treated according to the procedure outlined in Example I to give 61 mg. (98%) of crude lactone, M.P. 108–118°. Recrystallization from ether-hexane gave the analytical sample M.P. 135–137°. [Lit., J. A. Hartman, A. J. Thomasewski and A. S. Dreiding, J. Am. Chem. Soc. 78, 5662 (1956).]

Analysis.—Calc'd. for $C_{19}H_{26}O_4$: C, 71.69; H, 8.23. Found: C, 71.01; H, 8.11.

Example VII

Using 7 ml. of the reagent of Example I, 70 mg. of impure 1 - hydroxy - 5-oxo-8-methyl-trans-hydrindanyl-4-propionic acid (III) was treated according to the procedure outlined in Example I to give 70 mg. of crude gummy product, from which was isolated by chromatography on silica gel, 50 mg. of 1-acetoxy-5-hydroxy-8-methyl-trans - 5 - hydrindenyl-4-propionyl-5-lactone (IV), M.P. 105–110°. Recrystallization from n-hexane gave the analytical sample M.P. 115–116°. [Lit., M.P. 117°, L. Velluz et al., Compt. rendu, 257, 3086 (1963).]

Analysis.—Calc'd. for $C_{15}H_{20}O_4$: C, 68.16; H, 7.63. Found: C, 67.69; H, 7.48.

In practice, it has been found that the reagent required by this process may utilize a variety of solvents or mixtures of solvents including: Ethyl acetate, chloroform, hexane, ethylene dichloride, benzene and carbon tetrachloride. A variety of dehydrating agents may also be used, including: Acetic anhydride, 2,2-dimethoxypropane, acetyl chloride, and related organic dehydrating agents.

While it is preferred that the solvent contain 1.0 mole/l. of dehydrating agent and from $10^{-5}$ to $10^{-1}$ mole/l. of perchloric acid, proportioning of the constituents is limited solely by stoichiometric considerations. For example, optimum reaction time and minimum side reaction are obtained when perchloric acid is employed in a concentration range of about 1 to $5 \times 10^{-3}$ mole/l. The process is, of course, operable beyond this range but concentrations in excess of 1 mole/l. encourage side reactions while concentrations less than $5 \times 10^{-3}$ mole/l. tend to increase the reaction time. On the other hand, the reaction is not observably affected by wide variations in the concentration of dehydrating agent.

This unique method for the conversion of delta-keto acids to enol-lactones has proven extremely useful. It is, for example, a most valuable adjunct to known methods for total synthesis of steroids. In this connection, the mild operating conditions, ready volatilization of solvent and dehydrating agent and freedom from side reactions which characterize our process make it a most useful micro-synthetic technique. Its commercial significance is of course patently obvious.

It is to be understood that the foregoing general and particular description of specific embodiments of the present invention is given solely to facilitate understanding of the invention by those skilled in the art to which it pertains. Thus, such description may not be construed to limit the scope of the invention which will admit of other equally effective embodiments.

What is claimed is:

1. The method of converting a delta-keto acid to an enol-lactone, comprising:
    treating a delta-keto acid with a reagent comprising an admixture of a non-hydroxylic, non-etherated organic liquid containing an organic dehydrating agent and perchloric acid.

2. The method of converting a delta-keto acid to an enol-lactone, comprising:
    treating a delta-keto acid with a reagent comprising an admixture of ethyl acetate, acetic anhydride and perchloric acid.

3. The method of converting a delta-keto acid to an enol-lactone, comprising:
    treating a delta-keto acid with a reagent comprising an admixture of ethyl acetate, acetic anhydride and perchloric acid;
    quenching the resultant reaction when complete;
    and, isolating the reaction product.

4. The method of converting a delta-keto acid to an enol-lactone, comprising:
    admixing a delta-keto acid with a reagent comprising a major proportion of ethyl acetate, a minor proportion of acetic anhydride and a trace amount of perchloric acid;
    standing said admixture at room temperature and atmospheric pressure for several minutes;
    washing said admixture with a saturated sodium bicarbonate solution;
    phase separating and neutralizing said reagent;
    and, isolating the enol-lactone reaction product.

5. The method of claim 4, wherein;
    the concentration of perchloric acid in said reagent is between about 1 to $5 \times 10^{-3}$ mole/l.

6. The method of claim 1, wherein;
    said liquid hydrocarbon is selected from the group consisting of;
    ethyl acetate,
    chloroform,
    hexane,
    ethylene dichloride,
    benzene,
    and carbon tetrachloride.

7. The method of claim 1, wherein;
    said dehydrating agent is selected from the group consisting of;
    acetic anhydride,
    butyric anhydride,
    2,2-dimethoxypropane,
    and, acetylchloride.

8. The method of claim 4, wherein;
    said delta-keto acid comprises;
    5-oxo-3,5-seco-4-norcholestan-3-oic acid;
    and, said enol-lactone comprises;
    5-oxo-3,5-seco-4-norcholestan-3-oic- acid - 3,5-lactone.

9. The method of claim 4, wherein;
    said delta-keto acid comprises;
    5,20-dioxo-3,5-seco-4-norpregnan-3-oic acid and, enol-lactone comprises;
    5,20-dioxo-3,5-seco-4-norpregnan-3-oic acid - 3,5-lactone.

10. The method of claim 4, wherein;
said delta-keto acid comprises;
   17α-acetoxy-5,20-dioxo-3,5-seco-4-norpregnan-3-oic acid;
and, said enol-lactone comprises;
   17α-acetoxy-5,20-dioxo-3,5-seco-4-norpregnan-3-oic acid-3,5-lactone.

11. The method of claim 4, wherein;
said delta-keto acid comprises;
   5,17-dioxo-3,5-seco-4-norandrostan-3-oic acid;
and, said enol-lactone comprises;
   5,17-dioxo-3,5-seco-4-norandrostan-3-oic acid-3,5-lactone.

12. The method of claim 4, wherein;
said delta-keto acid comprises;
   17β-hydroxy-5-oxo-3,5-seco-4-norandrostan-3-oic acid;
and said enol-lactone comprises;
   17β-acetoxy-5-oxo-3,5-seco-4-norandrostan-3-oic acid-3,5-lactone.

13. The method of claim 4, wherein;
said delta-keto acid comprises;
   17β-hydroxy-5-oxo-3,5-seco-4-norestran-3-oic acid;
and, said enol-lactone comprises;
   17β-acetoxy-5-oxo-3,5-seco-4-norestran-3-oic acid-3,5-lactone.

14. The method of claim 4, wherein;
said delta-keto acid comprises;
   1-hydroxy-5-oxo-8-methyl-trans-hydridanyl-4-propionic acid;
and, said enol-lactone comprises;
   1-acetoxy-5-hydroxy-8-methyl-trans-5-hydrindenyl-4-propionyl-5-lactone.

References Cited

UNITED STATES PATENTS

| | | | |
|---|---|---|---|
| 2,883,424 | 4/1959 | Wildi | 260—586 |
| 2,897,202 | 7/1959 | Wildi | 260—287 |
| 2,951,074 | 8/1960 | Chemerda et al. | 260—239.55 |

FOREIGN PATENTS 858,596  6/1962  Great Britain.

OTHER REFERENCES

Falconi et al.: Chemical Abstracts, vol. 56 (1962), page 5333.

WALTER A. MODANCE, *Primary Examiner.*

J. A. PATTEN, *Assistant Examiner.*